United States Patent
Loi et al.

(10) Patent No.: US 10,795,414 B2
(45) Date of Patent: Oct. 6, 2020

(54) ELECTRONIC DEVICE AND OPERATION METHOD OF SELECTING A FUNCTION ITEM THEREOF

(71) Applicant: ASUSTEK COMPUTER INC., Taipei (TW)

(72) Inventors: Wean-Fong Loi, Taipei (TW); Yue-Hin Victor Kong, Taipei (TW); Ee-Fun Teo, Taipei (TW)

(73) Assignee: Asustek Computer Inc., Taipei (TW)

( * ) Notice: Subject to any disclaimer, the term of this patent is extended or adjusted under 35 U.S.C. 154(b) by 18 days.

(21) Appl. No.: 15/853,349

(22) Filed: Dec. 22, 2017

(65) Prior Publication Data

US 2018/0203486 A1    Jul. 19, 2018

(30) Foreign Application Priority Data

Jan. 18, 2017   (TW) .............................. 106101706 A

(51) Int. Cl.
| | |
|---|---|
| *G06F 1/16* | (2006.01) |
| *H04M 1/725* | (2006.01) |
| *G06F 3/0488* | (2013.01) |
| *G06F 21/36* | (2013.01) |

(Continued)

(52) U.S. Cl.
CPC ............ *G06F 1/1652* (2013.01); *G06F 1/163* (2013.01); *G06F 3/0488* (2013.01); *G06F 3/04847* (2013.01); *G06F 3/04883* (2013.01); *G06F 3/04886* (2013.01); *G06F 21/36* (2013.01);

(Continued)

(58) Field of Classification Search
CPC ........ G06F 3/0488; G06F 3/012; G06F 3/013; G06F 3/041; G06F 1/163; G06F 21/36; G06F 2203/04102; G06F 3/016; G06F 3/044; G06F 3/0481; G06F 3/04815; G06F 3/04845; G06F 21/31; G06F 3/0484; G06F 3/04847; G06F 3/16
See application file for complete search history.

(56) References Cited

U.S. PATENT DOCUMENTS

| | | | |
|---|---|---|---|
| 9,491,279 B2 | 11/2016 | Park et al. | |
| 2013/0231758 A1* | 9/2013 | Kim ...................... | G05B 15/02 700/90 |

(Continued)

FOREIGN PATENT DOCUMENTS

| | | |
|---|---|---|
| CN | 104678753 A | 6/2015 |
| CN | 105282276 A | 1/2016 |
| CN | 105808130 A | 1/2016 |

*Primary Examiner* — Olga V Merkoulova
(74) *Attorney, Agent, or Firm* — Muncy, Geissler, Olds & Lowe, P.C.

(57) ABSTRACT

An electronic device and an operation method of selecting a function item are provided. The operation method is applied to an electronic device. The operation method comprises the following steps: receiving a sliding instruction of a sliding path via the touch display and displaying a first pattern on the touch display. The first pattern includes the first function item or the second function item corresponding to the sliding path. A sliding track is displayed on an outer periphery of the first pattern corresponding to a sliding distance of the sliding instruction. When the sliding track meets a predetermined path, a function corresponding to the first function item or the second function item is executed by the processing unit.

11 Claims, 11 Drawing Sheets

(51) Int. Cl.
*G06F 3/0484* (2013.01)
*G04G 21/08* (2010.01)

(52) U.S. Cl.
CPC ........ *H04M 1/72577* (2013.01); *G04G 21/08* (2013.01)

(56) References Cited

U.S. PATENT DOCUMENTS

| | | | |
|---|---|---|---|
| 2013/0286035 A1* | 10/2013 | Chakirov | G06F 3/0488 345/589 |
| 2014/0098273 A1* | 4/2014 | Ito | H04N 5/23216 348/333.03 |
| 2014/0245226 A1* | 8/2014 | Butscher | G06F 3/0482 715/834 |
| 2016/0006862 A1* | 1/2016 | Park | H04M 1/72577 455/411 |
| 2016/0139627 A1* | 5/2016 | Fang | G06F 1/1643 345/173 |
| 2016/0259464 A1* | 9/2016 | Chan | G06F 3/0481 |
| 2016/0283094 A1* | 9/2016 | Choi | G06F 1/163 |
| 2017/0038859 A1* | 2/2017 | Park | G06F 1/1692 |
| 2018/0210629 A1* | 7/2018 | Loi | G06F 1/163 |
| 2018/0217682 A1* | 8/2018 | Dangy Caye | G06F 3/0362 |

\* cited by examiner

ELECTRONIC DEVICE AND OPERATION METHOD OF SELECTING A FUNCTION ITEM THEREOF

CROSS-REFERENCE TO RELATED APPLICATION

This application claims the priority benefit of TW application Ser. No. 106101706, filed on Jan. 18, 2017. The entirety of the above-mentioned patent application is hereby incorporated by references herein and made a part of specification.

BACKGROUND OF THE INVENTION

Field of the Invention

The disclosure relates to an electronic device and, more specifically, relates to a wearable electronic device.

Description of the Related Art

In present, wearable electronic devices, such as a smart watch, include rich functions, for example, answering telephone, watching notification, sending and receiving message, playing music and monitoring heart rate. However, the wearable device is often small-sized for the portability. Thus, the size of a display screen of the wearable device is also too small to operate conveniently.

For example, multiple interactive items are displayed on the display screen, and a user often needs to simultaneously watch the display screen and touch one of the interactive items accurately. However, it is difficult to accurately touch a required interactive item on a small touch screen when the user is in a moving state (for example, walking or running).

BRIEF SUMMARY OF THE INVENTION

According to a first aspect, an operation method of selecting a function item is provided. The operation method of selecting a function item is applied to an electronic device, the electronic device includes a processing unit and a touch display, the touch display displays a first function item and a second function item, the operation method comprising: receiving a sliding instruction of a sliding path via the touch display, displaying a first pattern on the touch display, wherein the first pattern includes the first function item or the second function item corresponding to the sliding path, and a sliding track is displayed on an outer periphery of the first pattern corresponding to a sliding distance of the sliding instruction, and when the sliding track meets a predetermined path, a function corresponding to the first function item or the second function item is executed by the processing unit.

According to a second aspect, an electronic device applied to an external device is provided. The electronic device comprises a touch display, a processing unit and a memory unit. The touch display displays a first function item and a second function item. The memory unit is electrically connected to the processing unit and stores an instruction.

When the instruction is executed by the processing unit, the processing unit executes the following steps: receiving a sliding instruction of a sliding path via the touch display and displaying a first pattern on the touch display. The first pattern includes the first function item and the second function item corresponding to the sliding path. A sliding track is displayed on an outer periphery of the first pattern corresponding to a sliding distance of the sliding instruction. When the sliding track meets a predetermined path, a function corresponding to the first function item or the second function item is executed.

In sum, in the electronic device and the operation method of selecting a function item thereof, after receiving a sliding instruction via the touch display, the selected function item is determined. When the sliding track meets the predetermined path, the selected function item is executed. As a result, the function item is selected via one gesture to get the required response. Moreover, during the operation of the electronic device, the user can select the required response quickly and accurately without keeping watching the interactive items on the display screen. In addition, since the operation is in a specific area of the display image, the covered area of the display image is small. As a result, the user watches the display content conveniently.

BRIEF DESCRIPTION OF THE DRAWINGS

These and other features, aspects and advantages of the invention will become better understood with regard to the following embodiments and accompanying drawings.

DETAILED DESCRIPTION OF THE EMBODIMENTS

An electronic device and an operation method of selecting a function item thereof are illustrated by referring to figures. The same components are denoted by the same symbols. In an embodiment, the electronic device is a smart watch, a phone, or a notebook computer, which is not limited herein. In embodiments, a smart watch is taken as an example.

Figure 1A:
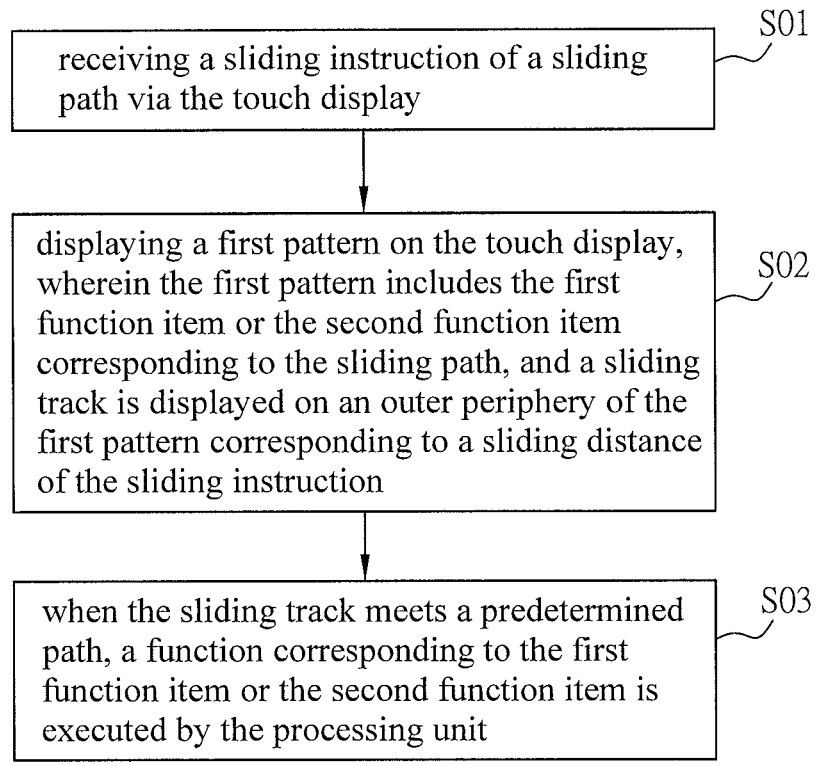
FIG. 1A is a flowchart of an operation method of selecting a function item of an electronic device in an embodiment.
Figure 1B:
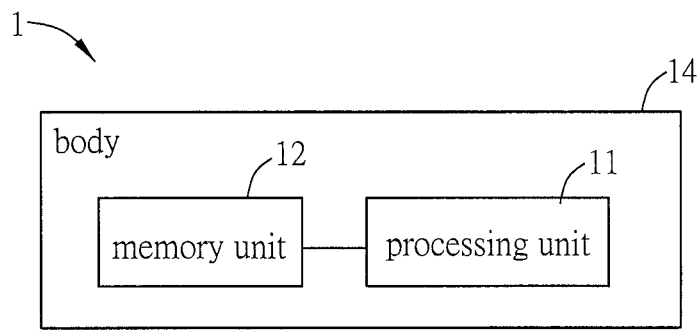
FIG. 1B is a block diagram of an electronic device in an embodiment.
Figure 1C:
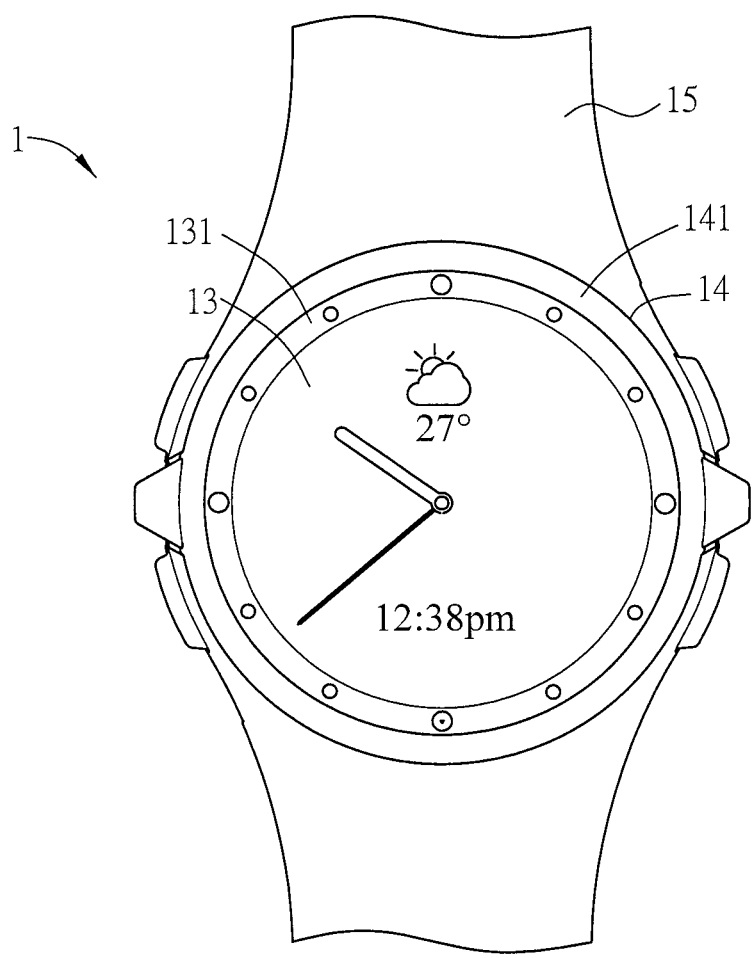
FIG. 1C is a schematic diagram of an appearance of an electronic device in an embodiment.
Figure 1D:
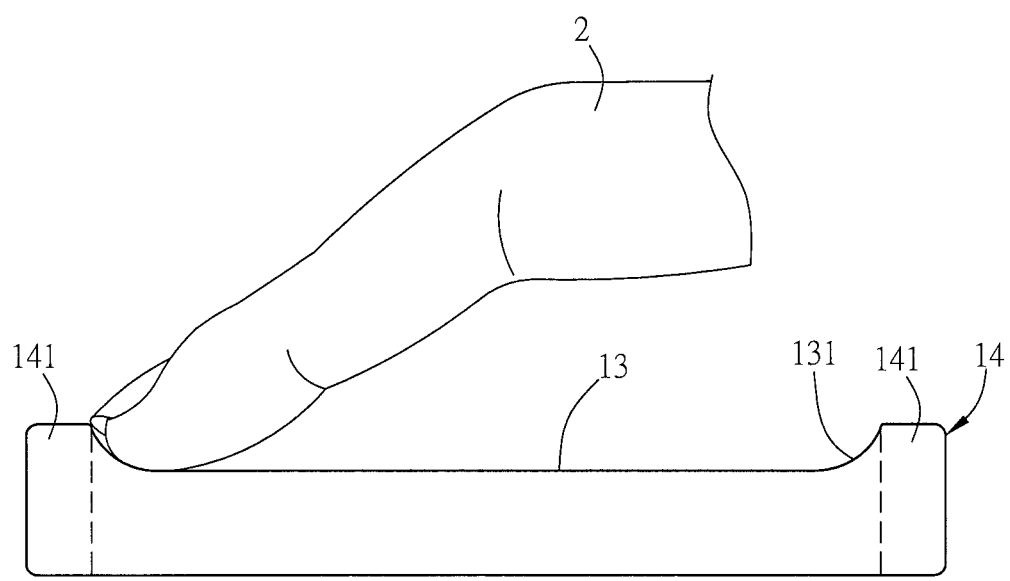
FIG. 1D is a schematic diagram showing operations of an electronic device in an embodiment.

Please refer to FIG. 1A to FIG. 1D. FIG. 1A is a flowchart of an operation method of selecting a function item of an electronic device in an embodiment. FIG. 1B is a block diagram of an electronic device in an embodiment. FIG. 1C is a schematic diagram of an appearance of an electronic device in an embodiment. FIG. 1D is a schematic diagram showing operations of an electronic device in an embodiment.

When a prompt box is appeared on the electronic device for users to select an operation of confirming (or executing) or canceling, the conversational or interactive function selection is called as a function item. The function item includes an operation of executing or not executing a function, answering or rejecting a call, confirming or canceling, or accepting or canceling, which is not limited herein.

The electronic device includes a processing unit and a touch display. The touch display is configured to display an image. For example, the touch display displays a first function item and a second function item. A touch operation is received at the touch display.

As shown in FIG. 1A, an operation method of selecting a function item of the electronic device includes the following steps. A sliding instruction with a sliding path is received at the touch display (step S01). A first pattern is displayed on the touch display. The first pattern includes the first function item or the second function item corresponding to the sliding path. A sliding track is displayed on an outer periphery of the first pattern synchronously corresponding to a sliding distance of the sliding instruction (step S02). When the sliding track meets a predetermined path, a function of the first function item or the second function item is executed by the processing unit (step S03). The operation process of selecting a function item is illustrated in detail via the electronic device 1 (a smart watch) shown in FIG. 1B to FIG. 2F.

As shown in FIG. 1B. The electronic device 1 includes a processing unit 11, a memory unit 12 and a body 14. The memory unit 12 is electrically connected to the processing unit 11 via a bus. The processing unit 11 and the memory unit 12 are disposed inside the body 14, respectively. In an embodiment, the body 14 includes a processing unit 11 and a memory unit 12, which is not limited herein. The number of the processing units 11 or the memory unit 12 in the body 14 is not limited herein.

The processing unit 11 is configured to access data stored in the memory unit 12. The processing unit 11 includes a control module of the electronic device 1. In an embodiment, the processing unit 11 includes a central processing unit (CPU) and a memory. In an embodiment, the processing unit 11 includes other control hardware, control software or control firmware, which is not limited herein.

The memory unit 12 is configured to store at least one application software, such as APP software including one or more instructions. When the user selects a function item to make the instruction or the program be executed by the processing unit 11, the processing unit 11 executes the above step S01 to the step S03, which is illustrated in detail hereinafter.

In an embodiment, the memory unit 12 is a non-transitory computer readable storage medium. The memory unit 12 includes a memory, a memory card, an optical disk, a videotape, a computer tape or a combination thereof. The memory is a read only memory (ROM), a flash memory, a field-programmable gate array (FPGA) or a combination thereof. In an embodiment, the memory unit 12 is a memory inside the electronic device 1. In an embodiment, the memory unit 12 is a cloud memory disposed in a cloud device. The application software is stored in the cloud device. The application software is executed after the application software is loaded to the electronic device 1 from the cloud device.

Please refer to FIG. 1C and FIG. 1D. In an embodiment, the electronic device 1 further includes a touch display 13 and a watch band 15. The watch band 15 is connected to the body 14 and allows the user to be worn on a wrist. The body 14 includes a bezel 141 surrounding the touch display 13. A height of the bezel 141 is higher than that of the touch display 13. Moreover, the touch display 13 includes a peripheral region 131.

The peripheral region 131 is configured at an outer periphery of the touch display 13. The peripheral region 131 is connected to the bezel 141. As shown in FIG. 1D, a height of the peripheral region 131 is decreased gradually from the height of the bezel 141 to the height of an inner side of the touch display 13. As a result, an object 2 (such as a finger) slides along the peripheral region 131 of the touch display 13 conveniently. Moreover, the object 2 is prevented from sliding out of the touch display 13 via a blocking of the bezel 141 with a higher height.

Please refer to FIG. 2A to FIG. 2F, an operation method of selecting a function item of the electronic device in an embodiment is illustrated. FIG. 2A to FIG. 2F are diagrams showing different display images of a touch display of an electronic device shown in FIG. 1C in an embodiment, respectively.

The touch display 13 of the electronic device 1 includes display and touch functions. Then, the user touches the touch display 13 via the object 2, such as a finger or a touch stylus, and slides on the touch display 13 to operate or control the electronic device 1.

Figure 2A:
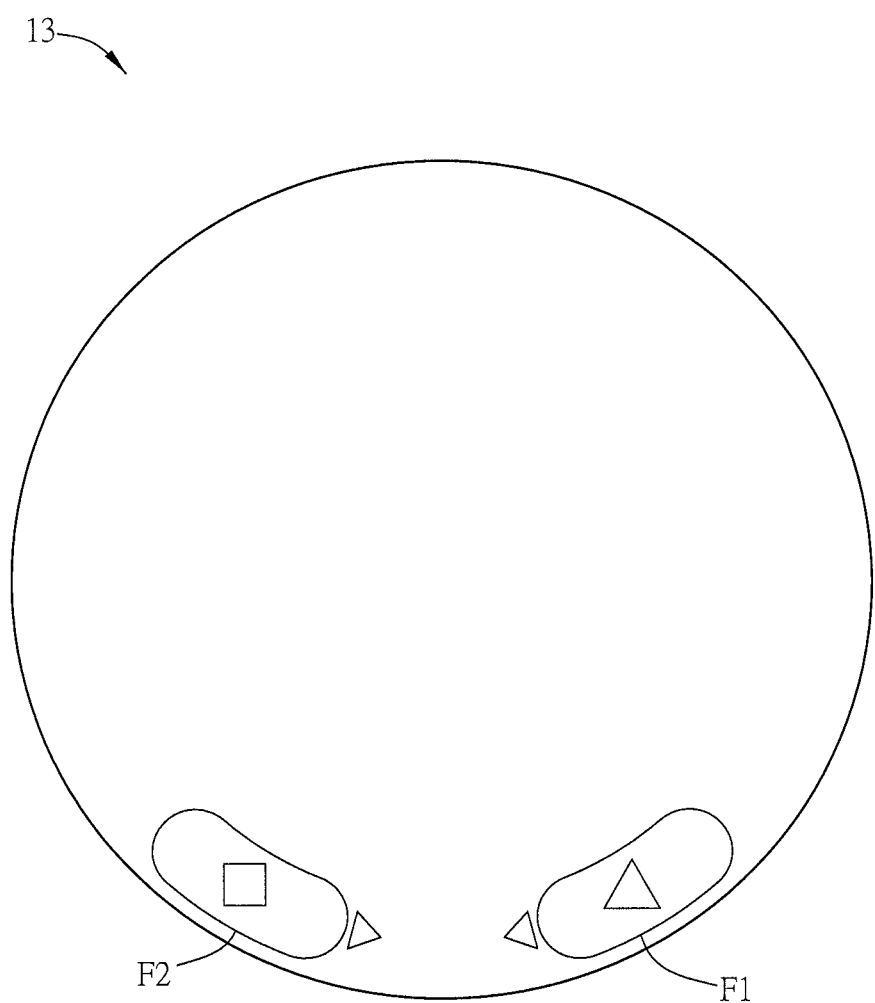
FIG. 2A to FIG. 2F are diagrams showing different display images of a touch display of an electronic device shown in FIG. 1C in an embodiment, respectively.

When functions are needed to be selected, as shown in FIG. 2A, the processing unit 11 controls the touch display 13 to display at least a first function item F1 and a second function item F2. In an embodiment, the first function item F1 represents executing a function, and the second function item F2 represents not executing (canceling) a function.

Figure 2B:
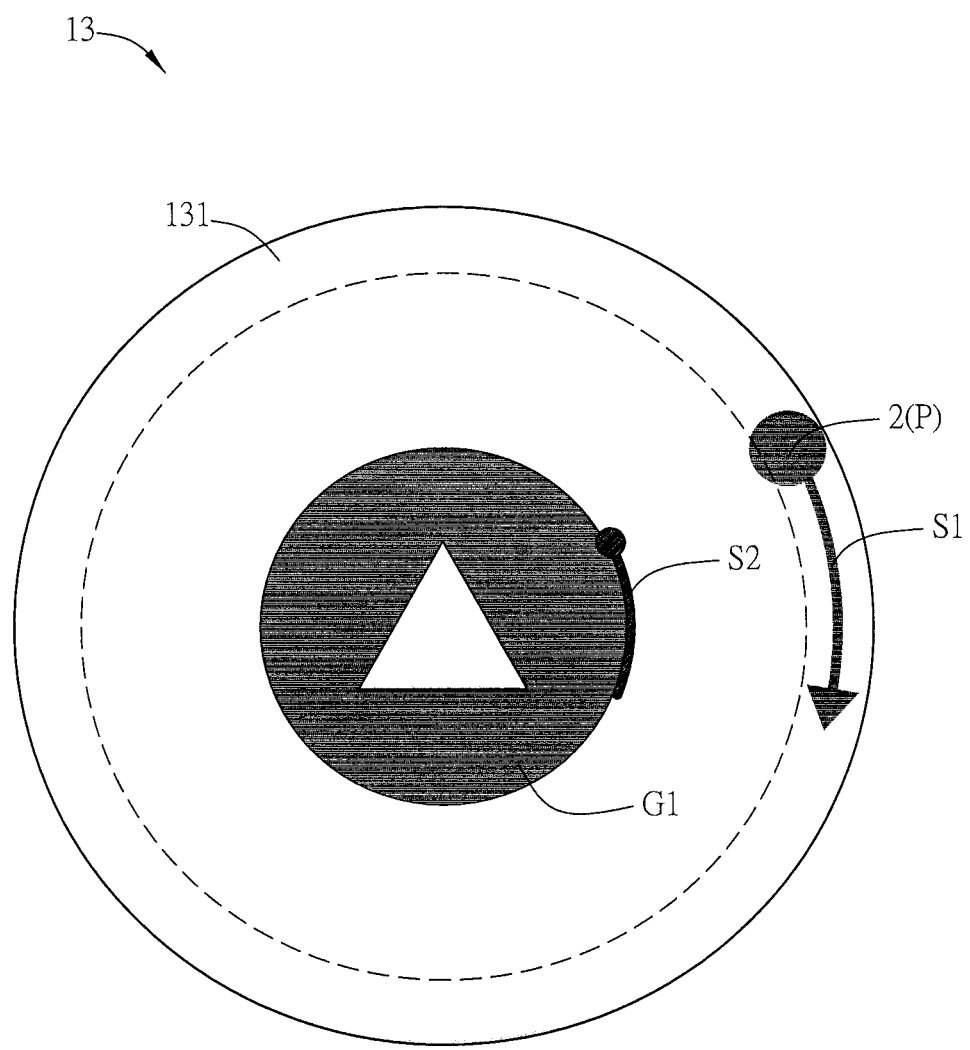

As show in FIG. 2B, the user touches a position P (a touch position P and the object are denoted as 2(P)) on the peripheral region 131 of the touch display 13 via the object 2 and slides. Thus, the touch display 13 receives a sliding instruction of a sliding path (step S01). In an embodiment, the touch display 13 (or the peripheral region 131 of the touch display 13) receives the sliding instruction of the sliding path for sliding in a clockwise direction or in a counter clockwise direction. Then, the first function item F1 or the second function item F2 is selected correspondingly.

After the processing unit 11 receives that the object 2 touches the position P of the peripheral region 131 of the touch display 13, the processing unit 11 detects and receives the sliding track and the sliding direction (that is, the sliding path) of the object 2 to determine which function item is selected by the user. For example, when the direction of the sliding track is a clockwise direction, the first function item F1 is selected. When the direction of the sliding track is a counter clockwise direction, the second function item F2 is selected, which is not limited herein.

Figure 2C:
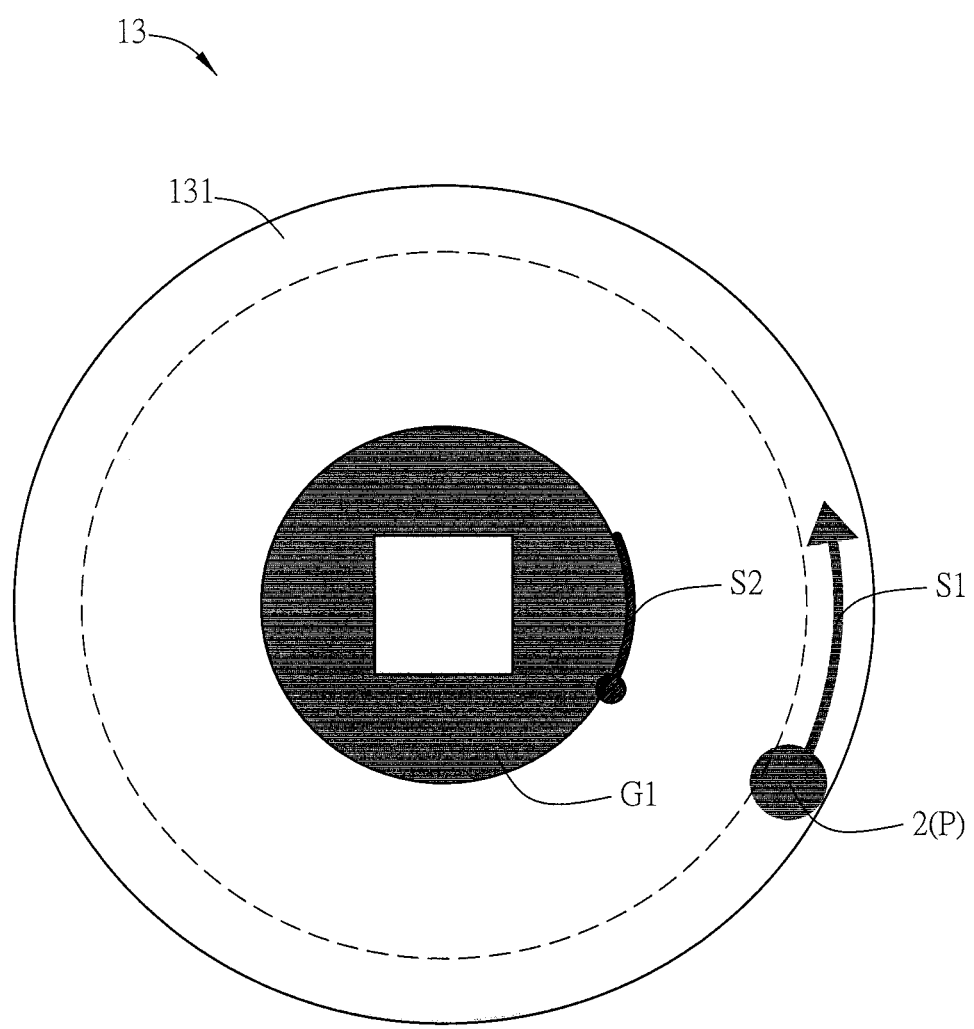

As shown in FIG. 2B. The object 2 slides along the peripheral region 131 from the position P toward the clockwise direction. Then, the processing unit 11 determines the first function item F1 is selected. In an embodiment, as shown in FIG. 2C, the object 2 slides along the peripheral region 131 from the position P toward the counter clockwise direction. Then, the processing unit 11 determines that the first function item F2 is selected. A starting position (the position P) touched by the object 2 is any position on the peripheral region 131, which is not limited. Moreover, the object 2 slides along the peripheral region 131, that is, along the bezel 141. Since the height of the bezel 141 is higher than that of the touch display 13, the object 2 would not slide out of the touch display 13. Mover, the user can slide without watching the display content of the touch display 13 continuously, which is more convenient.

Please refer to FIG. 2B, after the processing unit 11 determines the selected function item, the processing unit 11 controls to display a first pattern G1 on the touch display 13. In an embodiment, the first pattern G1 corresponds to the first function item F1 or the second function item F2 according to the sliding path. In an embodiment, a sliding track S2 is displayed synchronously on the outer periphery of the first pattern G1 corresponding to the sliding distance S1 of the sliding instruction (step S02).

In the embodiment, when the object 2 touches the position P and slides toward the clockwise direction, the first function item F1 is selected. Then, the processing unit 11 controls the first pattern G1 corresponding to the first function item F1 to be highlighted in the center part of the touch display 13. The sliding track S2 is displayed at the outer periphery of the first pattern G1 corresponding to the sliding distance S1 of the sliding instruction synchronously. In an embodiment, the pattern of the first pattern G1 and the pattern of the first function item F1 are the same to or different, which is not limited herein.

Moreover, the function item is highlighted by the way of increasing brightness with a same size, changing the size of the pattern, changing colors, or anti-white, which is not limited herein. For example, as the first pattern G1 shown in FIG. 2B, the highlight way is that the pattern is changed, and the size of the pattern is enlarged.

Moreover, a virtual track (that is, a sliding track of the object 2 is not displayed on the peripheral region 131 of the touch display 13, the sliding track cannot be seen by users) or a physical track (a track is displayed on the peripheral region 131 of the peripheral region 131 when the object 2 slides, the sliding track can be seen by users) is generated when the object 2 slides by the sliding distance S1 on the peripheral region 131. In the embodiment, the virtual track is taken as an example.

Figure 2D:
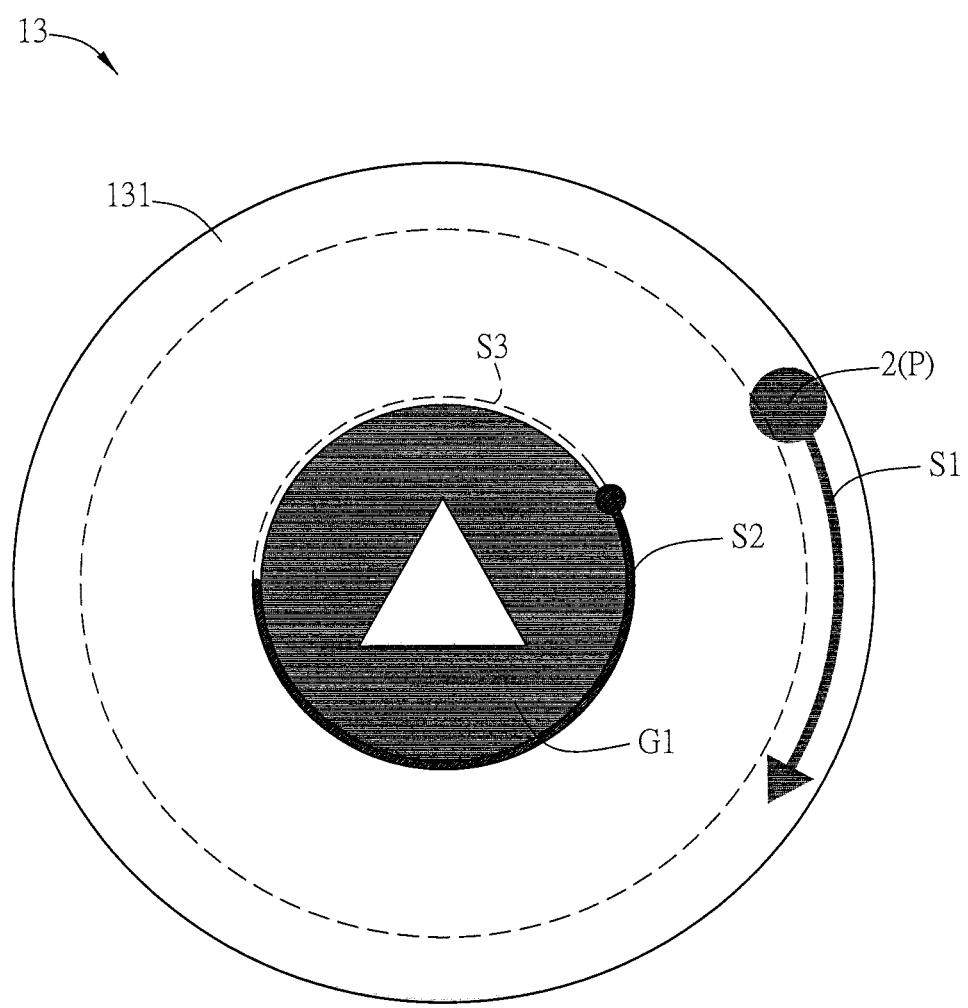
Figure 2E:
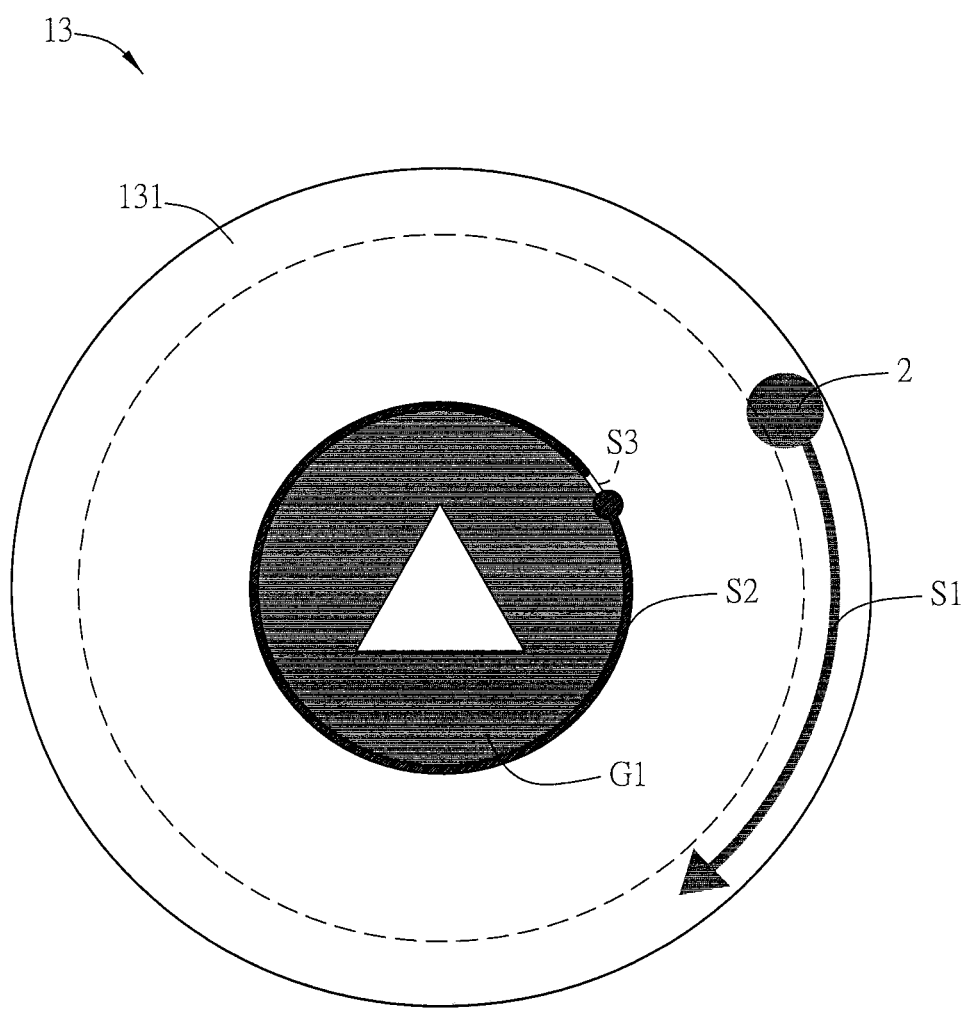

As shown in FIG. 2D and FIG. 2E, when the object 2 continues to slide along the peripheral region 131 toward the clockwise direction, the sliding track S2 is displayed at the outer periphery of the first pattern G1 synchronously corresponding to the sliding distance S1 of the object 2. The sliding track S2 is determined according to the sliding distance S1 of the object 2 on the peripheral region 131. In an embodiment, when the object 2 slides, the sliding distance S1 is in an equal proportion or a non-equal proportion with the sliding track S2. In other words, in an embodiment, the sliding distance S1 and the sliding track S2 changes in a same equal proportion when the object 2 slides. In an embodiment, the sliding distance S1 and the sliding track S2 changes in a non-equal proportion when the object 2 slides.

Moreover, the operation process of selecting the function item selection further includes: when the sliding track S2 meets a predetermined path S3, the processing unit 11 executes the function of the first function item F1 or the second function item F2 (step S03). Then, the object 2 leaves the touch display 13.

Figure 2F:
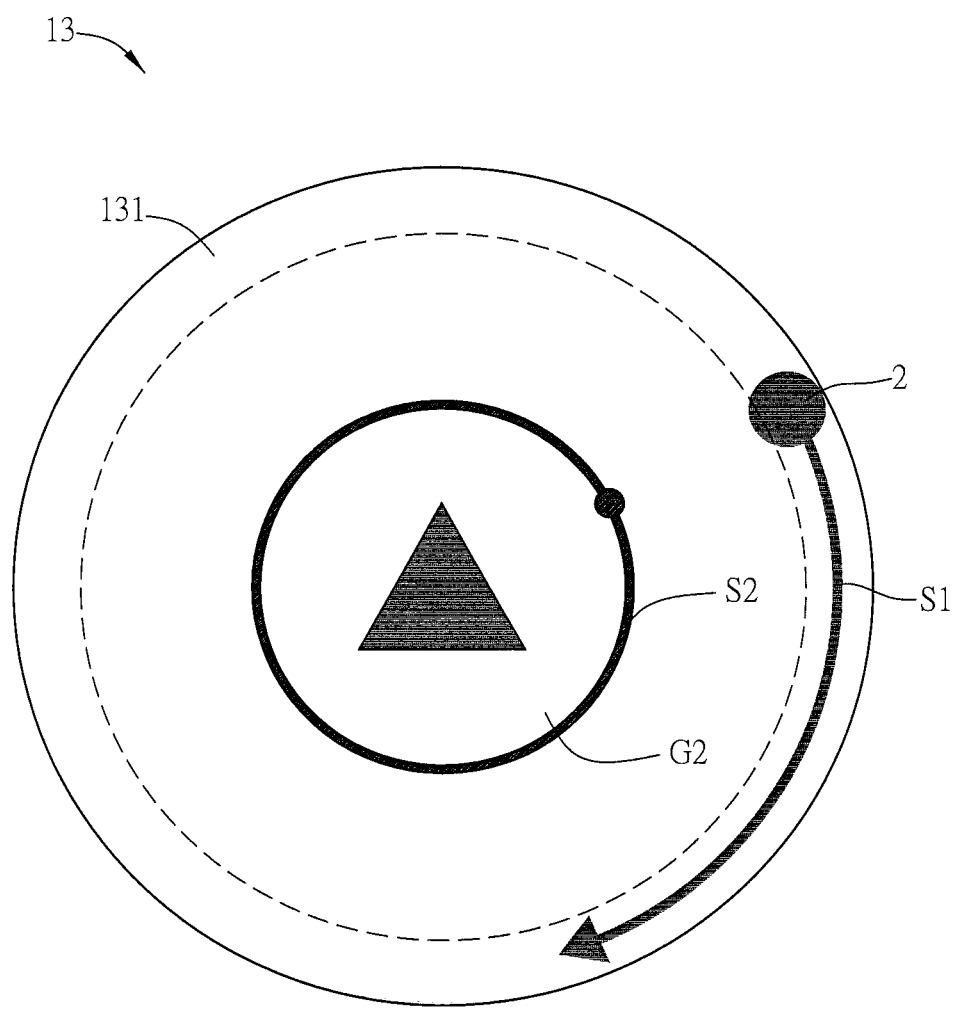

As shown in FIG. 2E and FIG. 2F, in an embodiment, the predetermined path S3 is a full circle (that is, the predetermined path S3 is a circle) surrounding the outer periphery of the first pattern G1. In an embodiment, the predetermined path S3 is a physical track, which is not limited herein. As a result, when the sliding track S2 surrounding the out periphery of the first pattern G1 corresponding to the sliding distance S1 of the object 2 reaches a full circle, the sliding track S2 meets the predetermined path S3.

The processing unit 11 executes the selected first function item F1. As shown in FIG. 2F, the image displayed on the touch display 13 is changed from the original first pattern G1 to a second pattern G2. In an embodiment, the second pattern G2 is a pattern, a text, a number, or a combination thereof, which is not limited herein. In an embodiment, the second pattern G2 is displayed highlightedly. Compared with the first pattern G1, the highlight of the second pattern G2 includes the way of increasing a brightness but not changing the size, changing the size of the pattern, changing a color, anti-white, or changing patterns. In an embodiment, the pattern of the second pattern G2 and the first pattern G1 are same, but the color distribution of the pattern is exchanged.

The operation method of determining whether the sliding track S2 meets the predetermined path S3 further includes a step of determining whether the sliding track S2 meets the predetermined path S3 according to a sliding speed (or an accelerated speed) of the sliding operation. In an embodiment, the faster the object 2 slides on the peripheral region 131 (or the larger the accelerated speed is), the shorter of the time for a full circle of the sliding track S2 is. Then, the sliding track S2 more likely conforms to the predetermined path S3.

In an embodiment, the operation method of determining whether the sliding track S2 meets the predetermined path S3 further includes a step of determining whether the sliding track S2 slides a few circles quickly. In an embodiment, the sliding track S2 slides two circles quickly. Then, the processing unit 11 determines that the sliding track S2 meets the predetermined path S3, which is not limited herein.

Moreover, in the embodiment, since the object 2 slides along the peripheral region 131 of the touch display 13, most of the display area would not be covered during the operation process of selecting the function item. As a result, the user watches the display content conveniently.

In the above embodiments, after the touch display 13 of the electronic device 1 displays the images of the first function item F1 and the second function item F2, the user touches any position of the peripheral region 131 via the object 2. The object 2 slides from the position along the peripheral region 131 toward the clockwise direction or the counter clockwise direction. Then, the touch display receives the sliding instruction of the sliding path.

The first function item F1 or the second function item F2 is selected. The sliding track S2 is displayed synchronously at the outer periphery of the first pattern G1 corresponding to the selected first function item F1 or the selected second function item F2 according to the sliding distance S1 of the object 2 on the peripheral region 131. Moreover, when the sliding track S2 meets the predetermined path S3, the processing unit 11 executes the functions of the selected first function item F1 or selected second function item F2.

As a result, the function item is selected to be executed via single sliding gesture. Moreover, the peripheral region 131 of the touch display 13 of the electronic device 1 is connected to the bezel 141. The height of the bezel 141 is higher than that of the touch display 13. As a result, the user can select a required response quickly and accurately without watching the interactive items on the display screen. Moreover, since the moving of the object is in a specific area of the display image, the covered area of the display image is kept in a minimum range. As a result, the user watches the display content conveniently.

Figure 3A:
FIG. 3A to FIG. 3C are schematic diagrams showing different function item selections executed by an electronic device shown in FIG. 1C.
Figure 3B:
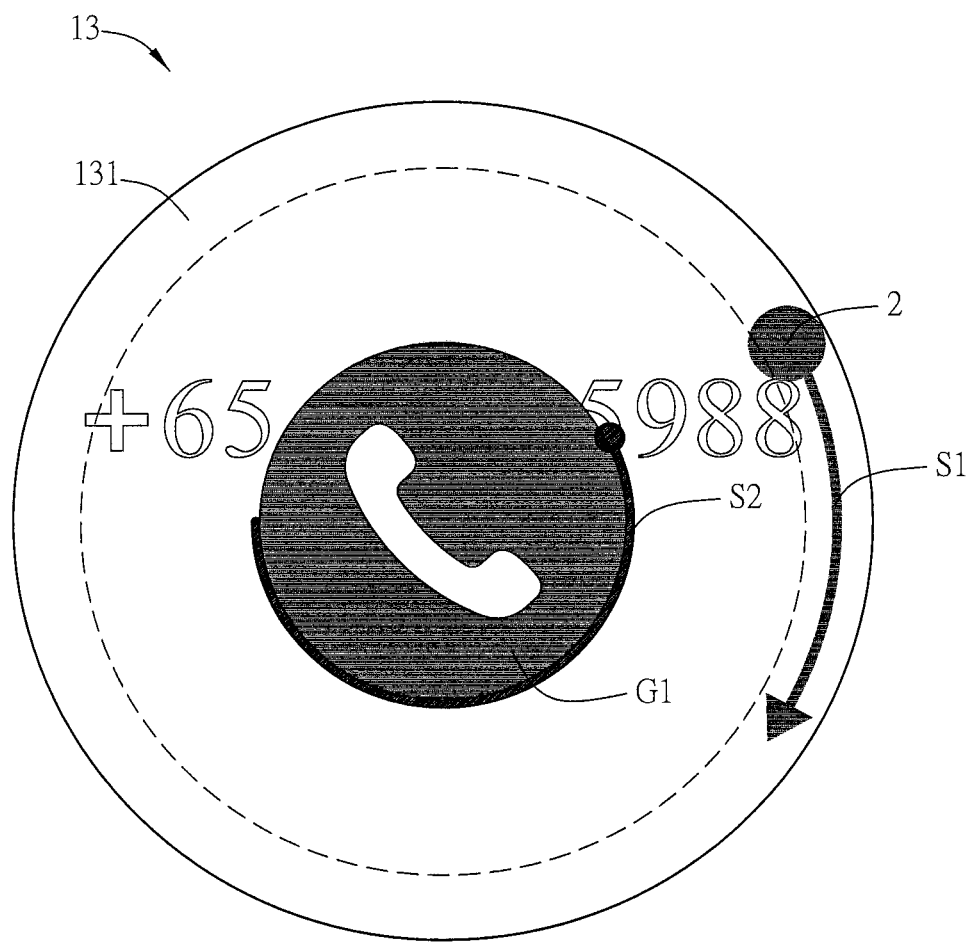
Figure 3C:
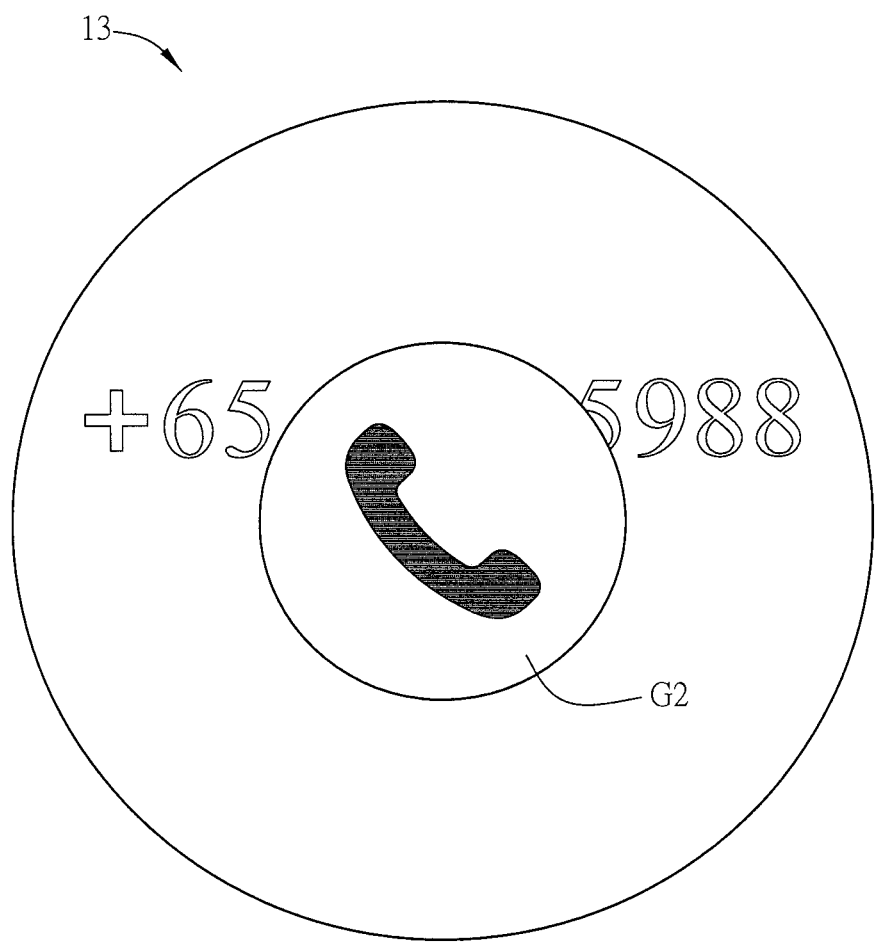

Please refer to FIG. 3A to FIG. 3C. FIG. 3A to FIG. 3C are schematic diagrams showing different function item are selected and executed by an electronic device shown in FIG. 1C.

As shown in FIG. 3A, when the electronic device 1 receives a call, an answering item (on the bottom right, the first function item F1) and a rejecting item (on the bottom left, the second function item F2) are displayed on the touch display 13. When the user touches a position of the peripheral region 131 via a finger and slides toward a clockwise direction, as shown in FIG. 3B, a telephone pattern of the answering item is displayed on the center area of the touch display 13.

The sliding track S2 is displayed synchronously on the outer periphery of the telephone pattern (the first pattern G1) according to the sliding distance S1 on the peripheral region 131. When the object 2 continues to slide along the peripheral region 131 toward the clockwise direction, the sliding track S2 on the outer periphery of the first pattern G1 surround the outer periphery of the first pattern G1 is a full circle, as shown in FIG. 3C, the selected first function item F1 (answering the call) is executed. Moreover, the processing unit 11 converts the display image to display the second pattern G2 instead of the original first pattern G1. In an embodiment, compared the second pattern G2 with the first pattern G1 in FIG. 3B, the patterns are same while the colors distribution of the pattern are exchanged.

Moreover, in an embodiment, the user clicks the pattern of the answering the call (F1) or rejecting the call (F2) in FIG. 3A directly, to select the function of answering the call or rejecting the call, which is not limited herein.

In sum, in the electronic device and the operation method of selecting a function item thereof, after receiving a sliding instruction via the touch display, the selected function item is determined. When the sliding track meets the predetermined path, the selected function item is executed. As a result, the function item is selected via one gesture to get the required response. Moreover, during the operation of the electronic device, the user can select the required response quickly and accurately without keeping watching the interactive items on the display screen. In addition, since the operation is in a specific area of the display image, the covered area of the display image is small. As a result, the user watches the display content conveniently.

Although the invention has been disclosed with reference to certain embodiments thereof, the disclosure is not for limiting the scope. Persons having ordinary skill in the art may make various modifications and changes without departing from the scope of the invention. Therefore, the scope of the appended claims should not be limited to the description of the embodiments described above.

What is claimed is:

1. An operation method of selecting a function item, applied to an electronic device with a processing unit and a touch display, the operation method comprising:
    displaying a first function item and a second function item by the touch display;
    receiving a sliding instruction of a sliding path only via a peripheral region of the touch display, wherein a bezel surrounds the touch display, the peripheral region of the touch display is connected to the bezel, a height of the bezel is higher than that of the touch display, a height of the peripheral region is decreased to the height of the touch display from the bezel toward an inner side of the touch display;
    displaying one selected function item selected from the first function item and the second function item according to the sliding path;
    displaying a sliding track on an outer periphery of the selected function item corresponding to a sliding distance of the sliding instruction; and
    when the sliding track meets a predetermined path, a function corresponding to the selected function item is executed by the processing unit.

2. The operation method according to claim 1, wherein the step of determining whether the sliding track meets the predetermined path includes:
    determining whether the sliding track meets the predetermined path according to a sliding speed of the sliding instruction.

3. The operation method according to claim 1, wherein the predetermined path is a circle.

4. The operation method according to claim 1, wherein when the sliding track meets the predetermined path, a display image of the touch display is converted to a second pattern.

5. The operation method according to claim 1, wherein the sliding instruction of the sliding path is received via the peripheral region of the touch display; the displayed one selected function item is selected from the first function item and the second function item according to the sliding path at the peripheral region; and the displayed sliding track on the outer periphery of the selected function item corresponds to the sliding distance of the sliding instruction of the sliding path at the peripheral region.

6. The operation method according to claim 1, wherein the selected function item and the sliding track on the outer periphery of the selected function item are displayed at a center of the touch display.

7. An electronic device, comprising:
    a body, including a bezel;
    a touch display displaying a first function item and a second function item, wherein the touch display is disposed on the body and includes a peripheral region, the peripheral region is connected to the bezel, the bezel surrounds the touch display, a height of the bezel is higher than that of the touch display, a height of the peripheral region is decreased to the height of the touch display from the bezel toward an inner side of the touch display;
    a processing unit; and
    a memory unit electrically connected to the processing unit, the memory unit stores an instruction, when the instruction is executed by the processing unit, the processing unit executes:
        receiving a sliding instruction of a sliding path only via the peripheral region of the touch display;
        displaying one selected function item selected from the first function item and the second function item according to the sliding path;
        displaying a sliding track on an outer periphery of the selected function item corresponding to a sliding distance of the sliding instruction; and
        when the sliding track meets a predetermined path, a function corresponding to the selected function item is executed.

8. The electronic device according to claim 7, wherein the predetermined path is a circle.

9. The electronic device according to claim 7, wherein when the sliding track meets the predetermined path, a display image of the touch display is converted to a second pattern.

10. The electronic device according to claim 7, wherein the sliding instruction of the sliding path is received via the peripheral region of the touch display; the displayed one selected function item is selected from the first function item and the second function item according to the sliding path at the peripheral region; and the displayed sliding track on the outer periphery of the selected function item corresponds to the sliding distance of the sliding instruction of the sliding path at the peripheral region.

11. The electronic device according to claim 7, wherein the selected function item and the sliding track on the outer periphery of the selected function item are displayed at a center of the touch display.

* * * * *